(12) United States Patent
Bastide et al.

(10) Patent No.: US 11,868,969 B2
(45) Date of Patent: Jan. 9, 2024

(54) ASSISTING USER IN MANAGING A CALENDAR APPLICATION

(71) Applicant: International Business Machines Corporation, Armonk, NY (US)

(72) Inventors: Paul R. Bastide, Ashland, MA (US); Margo L Ezekiel, Newton, MA (US); Karen M. O'Dea, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 17/128,144

(22) Filed: Dec. 20, 2020

(65) Prior Publication Data

US 2021/0110355 A1 Apr. 15, 2021

Related U.S. Application Data

(63) Continuation of application No. 16/695,482, filed on Nov. 26, 2019, now Pat. No. 10,902,386, which is a
(Continued)

(51) Int. Cl.
*G06Q 10/00* (2023.01)
*G06Q 10/1093* (2023.01)
(Continued)

(52) U.S. Cl.
CPC ....... *G06Q 10/1095* (2013.01); *G06F 16/248* (2019.01); *G06F 16/9535* (2019.01);
(Continued)

(58) Field of Classification Search
None
See application file for complete search history.

(56) References Cited

U.S. PATENT DOCUMENTS 4,626,836 A * 12/1986 Curtis .................. G06Q 10/109
283/67
5,070,470 A * 12/1991 Scully .................. G06Q 10/109
708/112
(Continued)

OTHER PUBLICATIONS

Aytug, Haldun, et al. "Executing production schedules in the face of uncertainties: A review and some future directions." European Journal of Operational Research 161.1 (2005): 86-110. (Year: 2005).*

(Continued)

*Primary Examiner* — Gurkanwaljit Singh
(74) *Attorney, Agent, or Firm* — Shackelford, Bowen, McKinley & Norton, LLP; Robert A. Voigt, Jr.

(57) ABSTRACT

A method, system and computer program product for managing a calendar application. A need to optimize a calendar is identified. Furthermore, a period of time to optimize the calendar is received or identified. All the scheduled events (e.g., scheduled meetings) in the calendar are then selected during that period of time. The attendees, topics and flags, if any, for each of the selected scheduled events during the period of time are extracted. Prior collaborations with the user involving the extracted attendees and/or topics of the selected scheduled events are identified. Collaboration data (e.g., participants/senders/attendees, topics) is then extracted from the identified prior collaborations. A list of actions (e.g., delegate scheduled event to another user) is generated to be performed on a selected scheduled event based on the extracted collaboration data. The generated list of actions to be performed on the selected scheduled event is then presented to the user.

20 Claims, 4 Drawing Sheets

Related U.S. Application Data continuation of application No. 15/373,976, filed on Dec. 9, 2016, now Pat. No. 10,546,275.

(51) Int. Cl.
  *G06F 16/248* (2019.01)
  *G06Q 10/0631* (2023.01)
  *G06F 16/9535* (2019.01)
  *G06F 40/00* (2020.01)
  *H04M 1/72451* (2021.01)

(52) U.S. Cl.
  CPC ..... *G06F 40/00* (2020.01); *G06Q 10/063116* (2013.01); *G06Q 10/1093* (2013.01); *H04M 1/72451* (2021.01)

(56) References Cited

U.S. PATENT DOCUMENTS

| | | | | |
|---|---|---|---|---|
| 5,943,652 | A * | 8/1999 | Sisley | G06Q 10/1097 705/7.22 |
| 5,948,040 | A * | 9/1999 | DeLorme | G06Q 10/02 701/426 |
| 6,016,478 | A * | 1/2000 | Zhang | G06Q 10/1095 709/202 |
| 6,073,110 | A * | 6/2000 | Rhodes | G06Q 10/109 715/963 |
| 6,085,166 | A * | 7/2000 | Beckhardt | G06Q 10/109 715/963 |
| 6,101,480 | A * | 8/2000 | Conmy | G06Q 10/1093 715/963 |
| 6,266,295 | B1 * | 7/2001 | Parker | G06Q 10/109 368/41 |
| 6,388,772 | B1 * | 5/2002 | Williams | H04N 1/32771 358/448 |
| 6,560,655 | B1 * | 5/2003 | Grambihler | H04L 69/329 714/707 |
| 6,820,096 | B1 * | 11/2004 | Kanevsky | G06Q 10/109 |
| 6,988,128 | B1 * | 1/2006 | Alexander | G06Q 10/109 709/206 |
| 6,999,731 | B2 * | 2/2006 | Cronin | H04M 1/72412 455/418 |
| 6,999,993 | B1 * | 2/2006 | Shah | H04L 67/565 709/224 |
| 7,082,402 | B2 * | 7/2006 | Conmy | G06Q 10/109 705/7.19 |
| 7,188,073 | B1 * | 3/2007 | Tam | G06Q 10/02 705/5 |
| 7,224,963 | B2 * | 5/2007 | Anderson | H04M 1/72406 455/414.3 |
| 7,369,750 | B2 * | 5/2008 | Cheng | H04N 21/47214 386/292 |
| 7,395,221 | B2 * | 7/2008 | Doss | G06Q 10/06314 705/7.19 |
| 7,584,278 | B2 * | 9/2009 | Rajarajan | H04L 41/0253 709/224 |
| 7,747,458 | B2 * | 6/2010 | Lyle | G06Q 10/1093 705/7.19 |
| 7,747,459 | B2 * | 6/2010 | Doss | G06Q 10/109 705/7.19 |
| 7,752,066 | B2 * | 7/2010 | Doss | G06Q 10/1095 705/7.19 |
| 7,818,198 | B2 * | 10/2010 | Masselle | G06Q 10/1093 705/7.18 |
| 8,005,703 | B2 * | 8/2011 | Chakra | G06Q 10/10 705/7.18 |
| 8,375,034 | B2 | 2/2013 | Norton et al. | |
| 8,874,456 | B2 * | 10/2014 | Lakritz | G06Q 10/06314 705/7.14 |
| 9,904,579 | B2 * | 2/2018 | Shear | G06F 16/245 |
| 9,916,538 | B2 * | 3/2018 | Zadeh | G06N 7/005 |
| 10,078,805 | B2 * | 9/2018 | Westlake | G06Q 10/063116 |
| 10,318,929 | B1 * | 6/2019 | Newman | G06Q 10/1095 |
| 10,445,702 | B1 * | 10/2019 | Hunt | G06Q 10/1097 |
| 10,572,476 | B2 * | 2/2020 | Skinder | G06F 16/3338 |
| 2001/0014866 | A1 * | 8/2001 | Conmy | G06F 40/103 705/7.19 |
| 2001/0014867 | A1 * | 8/2001 | Conmy | G06F 16/972 705/7.18 |
| 2001/0044903 | A1 * | 11/2001 | Yamamoto | H04L 63/08 726/26 |
| 2001/0049638 | A1 * | 12/2001 | Satoh | G06Q 30/0633 705/26.8 |
| 2002/0016729 | A1 * | 2/2002 | Breitenbach | G06Q 10/06311 707/999.1 |
| 2002/0029161 | A1 * | 3/2002 | Brodersen | G06Q 10/1093 705/7.14 |
| 2002/0044149 | A1 * | 4/2002 | McCarthy | H04M 1/72448 345/581 |
| 2002/0131565 | A1 * | 9/2002 | Scheuring | G06Q 10/109 379/88.19 |
| 2002/0138326 | A1 * | 9/2002 | Parker | G06Q 10/109 705/50 |
| 2003/0004773 | A1 * | 1/2003 | Clark | G06Q 10/109 705/7.19 |
| 2003/0028399 | A1 * | 2/2003 | Davis | G16Z 99/00 705/2 |
| 2003/0030751 | A1 * | 2/2003 | Lupulescu | H04N 7/17309 348/E5.103 |
| 2003/0046304 | A1 * | 3/2003 | Peskin | G06Q 10/109 |
| 2003/0097561 | A1 * | 5/2003 | Wheeler | G06Q 20/3823 713/168 |
| 2003/0100336 | A1 * | 5/2003 | Cronin | H04M 1/72412 455/556.2 |
| 2003/0130882 | A1 * | 7/2003 | Shuttleworth | G06Q 10/109 709/204 |
| 2003/0149605 | A1 * | 8/2003 | Cragun | G06Q 10/1095 705/7.13 |
| 2003/0149606 | A1 * | 8/2003 | Cragun | G06Q 10/1095 705/7.19 |
| 2003/0171973 | A1 * | 9/2003 | Wilce | G06Q 99/00 705/500 |
| 2004/0031035 | A1 * | 2/2004 | Shiu | G06F 21/6209 718/102 |
| 2004/0078256 | A1 * | 4/2004 | Glitho | G06Q 10/109 709/207 |
| 2004/0093290 | A1 * | 5/2004 | Doss | G06Q 10/1095 705/35 |
| 2004/0122721 | A1 * | 6/2004 | Lasorsa | G06Q 10/06314 705/7.24 |
| 2004/0125142 | A1 * | 7/2004 | Mock | G06Q 10/109 715/765 |
| 2004/0139452 | A1 * | 7/2004 | Hope | G06F 9/542 719/318 |
| 2004/0162882 | A1 * | 8/2004 | Mora | H04L 69/329 709/207 |
| 2004/0167877 | A1 * | 8/2004 | Thompson, III | G06Q 10/10 |
| 2004/0216168 | A1 * | 10/2004 | Trovato | H04N 21/4668 725/135 |
| 2005/0020314 | A1 * | 1/2005 | Choi | H04M 1/72451 455/564 |
| 2005/0085272 | A1 * | 4/2005 | Anderson | H04M 1/72406 455/566 |
| 2005/0091399 | A1 * | 4/2005 | Candan | H04L 65/1043 709/240 |
| 2005/0097440 | A1 * | 5/2005 | Lusk | G06Q 10/10 715/752 |
| 2006/0041460 | A1 * | 2/2006 | Aaron | G06Q 10/1093 715/963 |
| 2006/0177034 | A1 * | 8/2006 | Reding | H04M 3/46 379/211.02 |
| 2007/0101284 | A1 * | 5/2007 | Shaw | G06Q 10/107 715/764 |
| 2007/0230282 | A1 * | 10/2007 | May | G04G 11/00 368/29 |
| 2007/0239506 | A1 * | 10/2007 | Jania | G06Q 10/1093 705/7.18 |
| 2008/0028317 | A1 * | 1/2008 | Castelli | G06Q 10/109 715/744 |

(56) References Cited

U.S. PATENT DOCUMENTS

| | | | |
|---|---|---|---|
| 2008/0059256 A1* | 3/2008 | Lynch | G06Q 30/02 705/7.11 |
| 2008/0091504 A1* | 4/2008 | Lyle | G06Q 10/109 705/7.19 |
| 2008/0140488 A1 | 6/2008 | Oral et al. | |
| 2008/0155403 A1* | 6/2008 | Moses | G06Q 10/109 715/700 |
| 2008/0207263 A1* | 8/2008 | May | H04M 19/04 455/556.2 |
| 2009/0210351 A1* | 8/2009 | Bush | G06Q 50/188 705/80 |
| 2010/0017216 A1* | 1/2010 | Chakra | G06Q 10/1095 705/1.1 |
| 2010/0121666 A1* | 5/2010 | Niazi | H04L 12/1818 705/7.27 |
| 2011/0054976 A1* | 3/2011 | Adler | G06Q 10/109 705/7.18 |
| 2012/0179502 A1* | 7/2012 | Farooq | H04L 12/1818 705/7.13 |
| 2012/0215578 A1* | 8/2012 | Swierz, III | G06Q 50/205 705/7.14 |
| 2013/0282421 A1* | 10/2013 | Graff | G06F 16/9535 705/14.27 |
| 2014/0201126 A1* | 7/2014 | Zadeh | G06N 7/005 706/52 |
| 2015/0058324 A1* | 2/2015 | Kauwe | G06F 16/248 707/722 |
| 2015/0199653 A1* | 7/2015 | Cili | G06Q 10/1095 705/7.19 |
| 2015/0213411 A1* | 7/2015 | Swanson | G06Q 10/103 705/301 |
| 2016/0034305 A1* | 2/2016 | Shear | H04L 47/70 707/722 |
| 2016/0267439 A1* | 9/2016 | Bitran | G06Q 10/1095 |
| 2016/0275458 A1* | 9/2016 | Meushar | G06Q 10/109 |

OTHER PUBLICATIONS

Pentland, Brian T., and Martha S. Feldman. "Designing routines: On the folly of designing artifacts, while hoping for patterns of action." Information and organization 18.4 (2008): 235-250. (Year: 2008).*

Maes, Pattie. "Agents that reduce work and information overload." Readings in human-computer interaction. Morgan Kaufmann, 1995. 811-821. (Year: 1995).*

List of IBM Patents or Patent Applications Treated as Related, Jan. 14, 2021, pp. 1-2.

* cited by examiner

ASSISTING USER IN MANAGING A CALENDAR APPLICATION

TECHNICAL FIELD

The present invention relates generally to calendaring systems, and more particularly to assisting the user in managing a calendar application.

BACKGROUND

Calendaring systems, in the simplest form, help users to organize their time. Additionally, calendaring systems may be used to schedule meetings, appointments, vacations or other types of calendar events or activities.

However, users may have difficulty in managing their calendar, which may include numerous meetings, activities, etc. At times, some of these scheduled events may overlap other scheduled events. Furthermore, some of these scheduled events may even be duplicates. As a result, users may have to spend time in determining how to address the overlapped or duplicate scheduled events resulting in loss of time and frustration.

Furthermore, if a user desires to take a vacation but there are numerous previously scheduled events during the time the user desires to take a vacation, then the user will have to spend time in resolving the conflicts resulting in further loss of time and frustration.

Currently, calendaring systems do not assist the user in managing the user's calendar to address such situations.

SUMMARY

In one embodiment of the present invention, a computer-implemented method for managing a calendar application comprises receiving or identifying a period of time to optimize a calendar, where the period of time is determined based on a period of time a calendar client agent determined that a need existed to optimize the calendar. The method further comprises selecting all scheduled events in the calendar during the period of time. The method additionally comprises extracting attendees, topics and flags for each selected scheduled event during the period of time. Furthermore, the method comprises identifying prior collaborations with a user of the calendar involving the extracted attendees and topics of the selected scheduled events. Additionally, the method comprises extracting collaboration data from the identified prior collaborations, where the collaboration data comprises data concerning an interaction between the user and others involving an activity. In addition, the method comprises generating a list of actions to be performed on a scheduled event of the selected scheduled events based on the extracted collaboration data. The method further comprises presenting the generated list of actions to the user of the calendar to be performed on the scheduled event to the user. The method additionally comprises determining whether the user selected an action from the list of actions. Furthermore, the method comprises performing an action on the scheduled event in response to the user selecting the action from the list of actions thereby improving a functionality of calendaring systems by allowing the user to better manage the users' scheduled events in the user's calendar.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
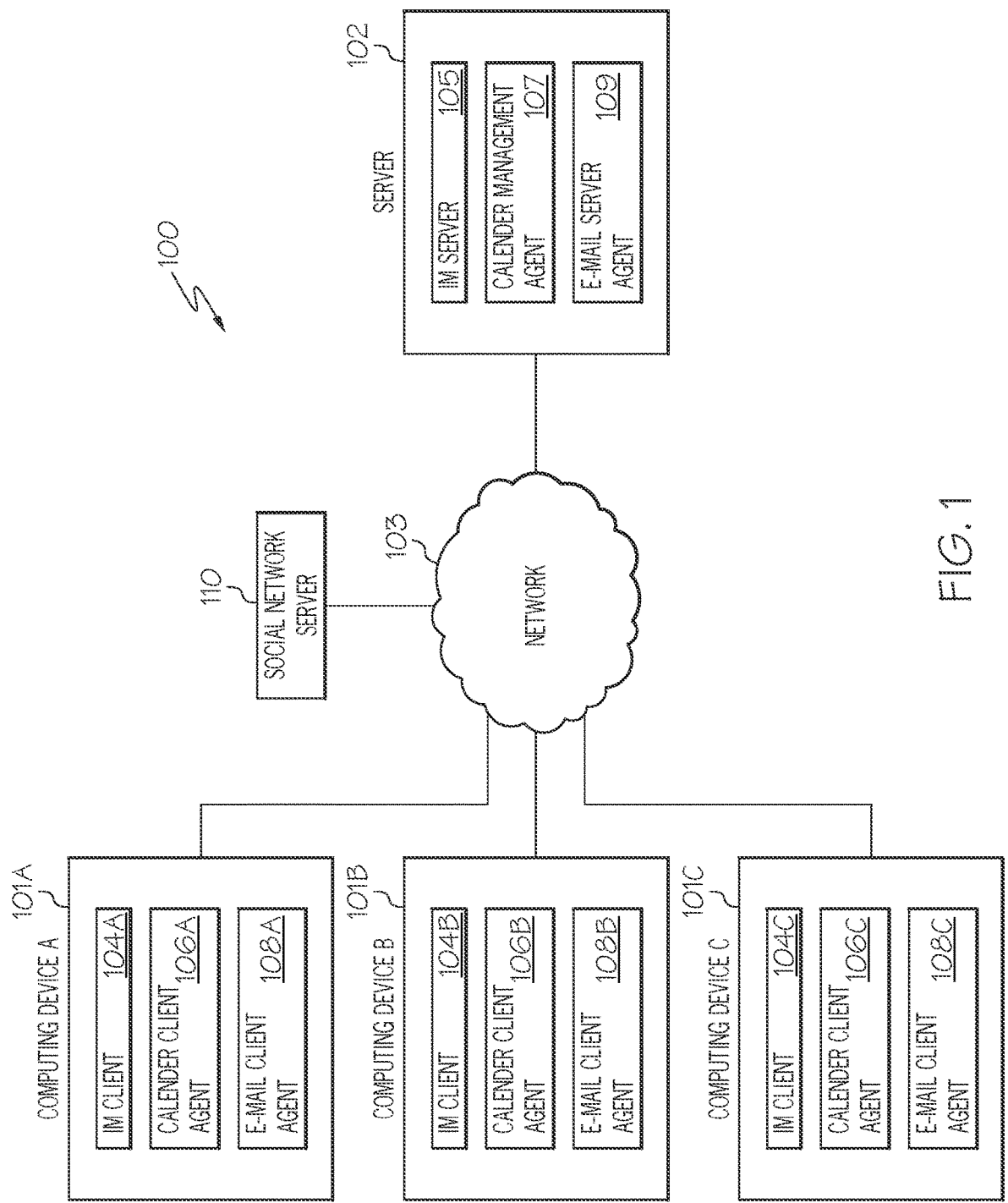
FIG. 1 illustrates a communication system configured in accordance with an embodiment of the present invention.

The present invention comprises a method, system and computer program product for managing a calendar application. In one embodiment of the present invention, a calendar client agent identifies a need to optimize a calendar. For example, the client calendar agent may determine that there is a need to optimize the user's calendar based on detecting an overlap of scheduled events. A period of time to optimize the calendar is received or identified by the client calendar agent (e.g., the period of time in which the scheduled events overlap). Client calendar agent then selects all the scheduled events (e.g., scheduled meetings, scheduled appointments) in the calendar during that period of time. The attendees, topics and flags, if any, for each of these selected scheduled events during the period of time are extracted by the calendar client agent. Prior collaborations with the user involving the extracted attendees and/or topics of the selected scheduled events are identified by the calendar client agent. For example, such prior collaborations with the user may involve social media posts, e-mail messages, instant messages and previously scheduled calendar events with the user. Collaboration data is then extracted from the identified prior collaborations by the calendar client agent. "Collaboration data," as used herein, refers to data concerning the interaction between the user and others involving an activity (e.g., work activity, such as a meeting, social activity). Examples of such collaboration data include the names of the participants/senders/attendees in the social media posts, e-mail messages, instant messages and previously scheduled calendar events as well as the topics of such prior collaborations. A list of actions may then be generated to be performed on a selected scheduled event based on the extracted collaboration data. For example, the list of actions may include delegating the scheduled event to another user who engaged in a prior collaboration with the user involving a topic within a threshold degree of similarity as the topic of the scheduled event. The generated list of actions to be performed on the scheduled event is then presented to the user. In this manner, the user is provided an opportunity to select an action (e.g., delegating the scheduled meeting to another user) to optimize the calendar to address situations, such as having an excessive number of scheduled events over a period of time, an overlap of scheduled events over a period of time, a duplicate scheduled event, scheduling a vacation during a time in which events have previously been scheduled, having an excessive amount of work to be accomplished, etc.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101 and server 102. Computing device 101 may be configured to send and receive text-based messages in real-time during an instant messaging session. Any user of computing devices 101 may be the creator or initiator of an instant message (message in instant messaging) and any user of computing devices 101 may be a recipient of an instant message. Furthermore, computing device 101 may be configured to send out calendar appointments or meeting notices/invitations to other computing devices 101 using a calendar application via network 103. Any user of computing devices 101 may be the creator or initiator of a meeting invitation and any user of computing devices 101 may be a recipient of a meeting invitation. Similarly, any user of computing devices 101 may be the creator or initiator of an e-mail message and any user of computing devices 101 may be a recipient of an e-mail message. A description of the hardware configuration of computing device 101 is provided below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing devices 1011A-101C include a software agent, referred to herein as an Instant Messaging (IM) client 104A-104C, respectively. Instant messaging clients 104A-104C may collectively or individually be referred to as instant messaging clients 104 or instant messaging client 104, respectively. Furthermore, server 102 includes a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for computing device 101 to connect to the IM server 105 which provides the functionality of distributing the instant messages to the IM clients 104 associated with each of the sharing users.

Computing devices 101A-101C may further include a software agent, referred to herein as a calendar client agent 106A-106C, respectively. Calendar client agents 106A-106C may collectively or individually be referred to as calendar client agents 106 or calendar client agent 106, respectively. Furthermore, server 102 may include a software agent, referred to herein as the calendar management agent 107. Calendar management agent 107 interfaces with calendar client agent 106 to present meeting invitations to computing devices 101. Calendar client agent 106 is configured to display the received meeting invitation as well as display calendar schedule information on the client device's 101 calendar user interface. Furthermore, calendar client agent 106 is configured to assist the user in managing a calendar application as discussed further below in connection with FIGS. 3-5.

Furthermore, computing devices 101A-101C may include a software agent, referred to herein as an e-mail client agent 108A-108C, respectively. E-mail client agents 108A-108C may collectively or individually be referred to as e-mail client agents 108 or e-mail client agent 108, respectively. Furthermore, server 102 may include a software agent, referred to herein as the e-mail server agent 109. E-mail client agent 108 enables the user of computing device 101 to create, send and receive e-mails. E-mail server agent 109 is configured to receive e-mail messages from computing devices 101 and distribute the received e-mail messages among the one or more computing devices 101.

While the preceding discusses each computing device 101 as including an IM client 104, a calendar client agent 106 and an e-mail client agent 108, each computing device 101 may not necessarily include each of these software agents, but only a subset of these software agents. Furthermore, while the preceding discusses a single server 102 including the software agents, such as IM server 105, calendar management agent 107 and e-mail server agent 109, multiple servers may be used to implement these services. Furthermore, each server 102 may not necessarily be configured to include all of these software agents, but only a subset of these software agents.

System 100 further includes a social network server 110, which may be a web server configured to offer a social networking and/or microblogging service, enabling users of computing devices 101 to send and read other users' posts. "Posts," as used herein, include any one or more of the following: text (e.g., comments, sub-comments and replies), audio, video images, etc. Social network server 110 is connected to network 103 by wire or wirelessly, While FIG. 1 illustrates a single social network server 110, it is noted for clarity that multiple servers may be used to implement the social networking and/or microblogging service.

System 100 is not to be limited in scope to any one particular network architecture. System 100 may include any number of computing devices 101, servers 102, networks 103 and social network servers 110.

Figure 2:
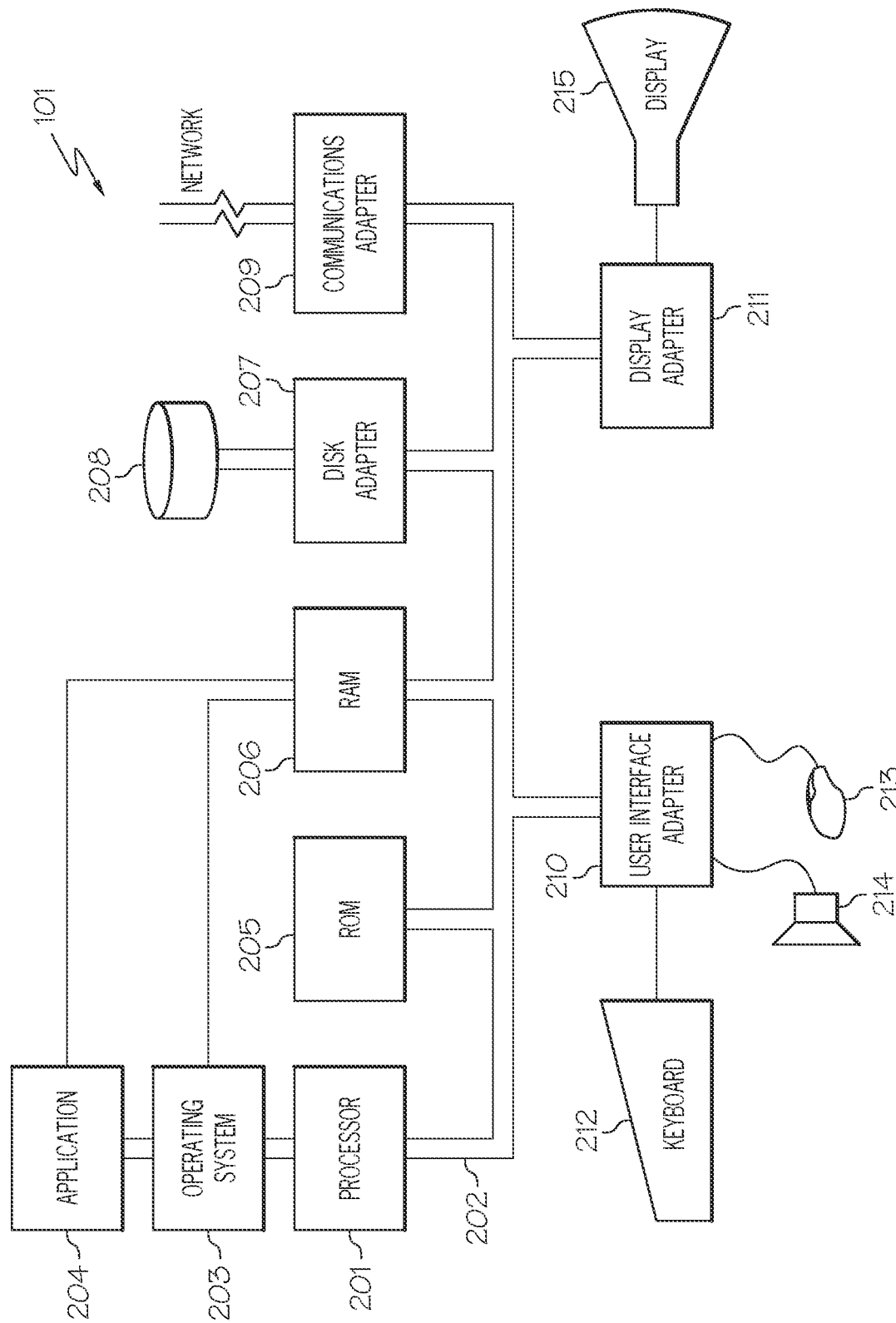
FIG. 2 illustrates a hardware configuration of a computing device in accordance with an embodiment of the present invention.

Referring now to FIG. 2, FIG. 2 illustrates a hardware configuration of computing device 101 (FIG. 1) which is representative of a hardware environment for practicing the present invention. Referring to FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a calendar application as well as calendar client agent 106 (FIG. 1) for assisting the user in managing a calendar application as discussed further below in connection with FIGS. 3-5.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive.

Computing device 101 may further include a communications adapter 209 coupled to bus 202. Communications adapter 209 interconnects bus 202 with an outside network (e.g., network 103 of FIG. 1) thereby enabling computing device 101 to communicate with other computing devices 101, server 102 and social network server 110.

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214. Other input mechanisms may be used to input data to computing device 101 that are not shown in FIG. 2, such as display 215 having touch-screen capability and keyboard 212 being a virtual keyboard. Computing device 101 of FIG. 2 is not to be limited in scope to the elements depicted in FIG. 2 and may include fewer or additional elements than depicted in FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement, the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, calendaring systems, in the simplest form, help users to organize their time. Additionally, calendaring systems may be used to schedule meetings, appointments, vacations or other types of calendar events or activities. However, users may have difficulty in managing their calendar, which may include numerous meetings, activities, etc. At times, some of these scheduled events may overlap other scheduled events. Furthermore, some of these scheduled events may even be duplicates. As a result, users may have to spend time in determining how to address the overlapped or duplicate scheduled events resulting in loss of time and frustration. Furthermore, if a user desires to take a vacation but there are numerous previously scheduled events during the time the user desires to take a vacation, then the user will have to spend time in resolving the conflicts resulting in further loss of time and frustration. Currently, calendating systems do not assist the user in managing the user's calendar to address such situations.

Figure 3:
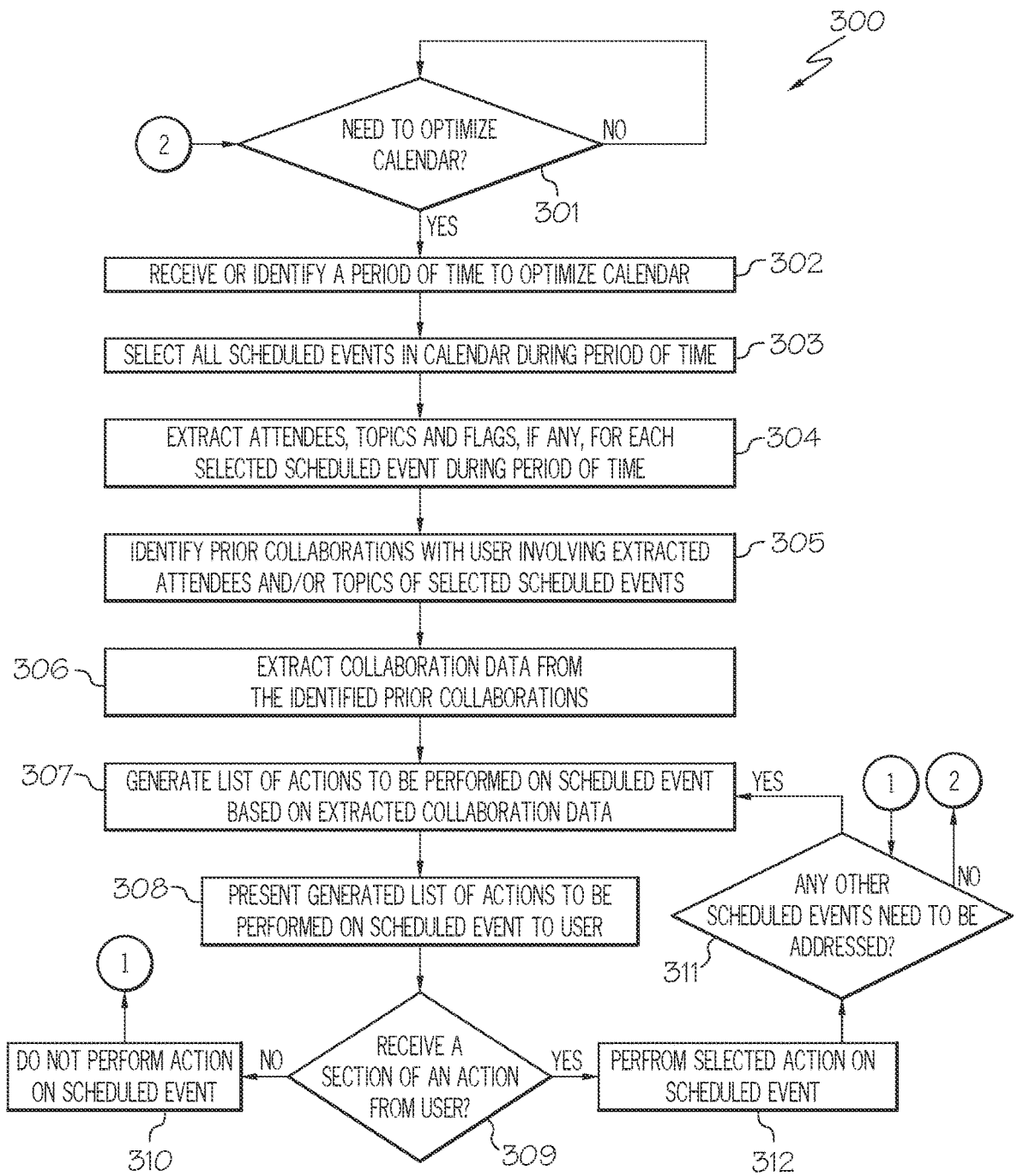
FIG. 3 is a flowchart of a method for assisting the user in managing a calendar application in accordance with an embodiment of the present invention.
Figure 4:
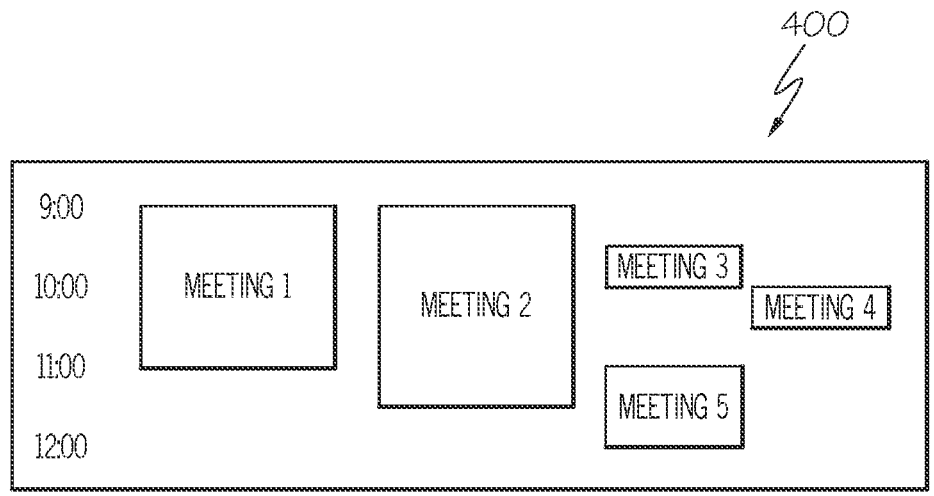
FIG. 4 illustrates multiple overlapped scheduled events in accordance with an embodiment of the present invention.
Figure 5:
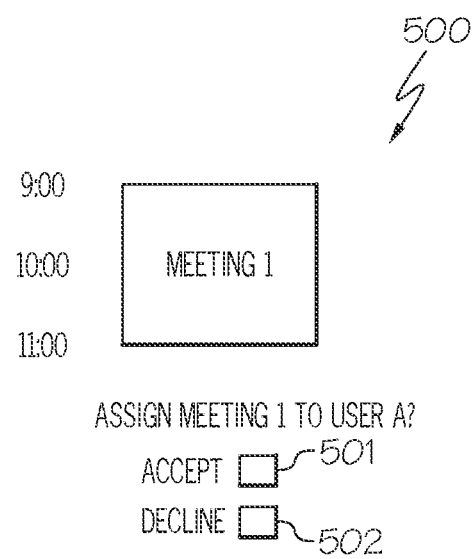
FIG. 5 illustrates presenting to the user of the calendar application the option of delegating a scheduled event to another user in accordance with an embodiment of the present invention.

The principles of the present invention provide a means for assisting the user in managing a calendar application to address such situations as discussed below in connection with FIGS. 3-5. FIG. 3 is a flowchart of a method for assisting the user in managing a calendar application. FIG. 4 illustrates multiple overlapped scheduled events. FIG. 5 illustrates presenting to the user of the calendar application the option of delegating a scheduled event to another user.

As stated above, FIG. 3 is a flowchart of a method 300 for assisting user 101 (FIG. 1) in managing a calendar application in accordance with an embodiment of the present invention.

Referring to FIG. 3, in conjunction with FIGS. 1-2, in step 301, a determination is made by calendar client agent 106 as to whether there is a need to optimize the user's calendar. In one embodiment, such a determination is made by calendar client agent 106 obtaining calendar information from the user's calendar application (e.g., Google® Calendar) via the calendar application's application programming interface (API).

For example, calendar client agent 106 may determine that there is a need to optimize the user's calendar based on the number of scheduled events (e.g., scheduled meetings, scheduled activities, scheduled appointments, scheduled vacations) exceeding a threshold number over a period of time. In another example, calendar client agent 106 may determine that there is a need to optimize the user's calendar based on detecting an overlap of scheduled events over a period of time. In a further example, calendar client agent 106 may determine that there is a need to optimize the user's calendar based on detecting a vacation. In another example, calendar client agent 106 may determine that there is a need to optimize the user's calendar based on detecting a duplicate scheduled event. In a further example, calendar client agent 106 may determine that there is a need to optimize the user's calendar based on a metric (commonly referred to as "velocity") for how much work is expected to be accomplished for the user (or an organization, group or team involving the user) over a period of time exceeding a threshold number.

If a need has not been identified to optimize the user's calendar, then calendar client agent 106 continues to determine whether there is a need to optimize the user's calendar in step 301.

If, however, a need has been identified to optimize the user's calendar, then, in step 302, calendar client agent 106 receives or identifies a period of time to optimize the calendar. In one embodiment, calendar client agent 106 receives a period of time from the user via a user interface of computing device 101. In one embodiment, calendar client agent 106 determines the period of time to optimize the calendar based on the period of time calendar client agent 106 determined that a need existed to optimize the calendar as discussed above in connection with step 301. For example, calendar client agent 106 may have detected overlapped scheduled events over a four hour window of time. In another example, calendar client agent 106 may have detected a scheduled vacation for this coming Monday. Such period of times may correspond to the period of time to optimize the calendar.

In step 303, calendar client agent 106 selects all the scheduled events in the calendar during the period of time. As discussed above, calendar client agent 106 may extract the calendar information (e.g., scheduled events over a period of time) from the user's calendar application (e.g., Google® Calendar) via the calendar application's application programming interface (API). For example, calendar client agent 106 may select all the scheduled events during a three hour window of time involving overlapped scheduled events as shown in FIG. 4.

FIG. 4 illustrates multiple overlapped scheduled events in accordance with an embodiment of the present invention. Referring to FIG. 4, user interface 400 (displayed on the user interface of computing device 101) illustrates five overlapped scheduled events (e.g., meetings). For example, meting 1 is scheduled from 9:00-11:00, meeting 2 is scheduled from 9:00-11:30, meeting 3 is scheduled from 9:30-10:00, meeting 4 is scheduled from 10:00-10:30 and meeting 5 is scheduled from 11:00-12:00. These scheduled events are selected to be optimized by calendar client agent 106 due to the fact that their scheduled times overlap one another.

Returning to FIG. 3, in conjunction with FIGS. 1-2 and 4, in step 304, calendar client agent 106 extracts the attendees, topics and flags, if any, for each selected scheduled event during the period of time obtained in step 302. Attendees, as used herein, refer to those who are present at an event, meeting, etc., or at a particular place.

In one embodiment, the attendees (e.g., invitees) for each selected scheduled event are extracted from the calendar information obtained from the user's calendar application (e.g., Google® Calendar) via the calendar application's application programming interface (API). Such attendees may include those that are required to attend the scheduled event as well as those that are optionally invited to attend, such as via the carbon copy option, or are just informed, such as via the blind carbon copy option.

In one embodiment, the topic is extracted for each selected scheduled event using natural language processing. For example, calendar client agent 106 may utilize natural language processing to identify keywords in the description of the scheduled event (e.g., meeting) obtained from the calendar information extracted from the user's calendar application. For instance, if the description of meeting 1 of FIG. 4 is "teleconference call with Examiner regarding patent application involving references teaching growing crystalline semiconductor oxide thin films on a substrate," then calendar client agent 106 may identify keywords, such as "teleconference call with Examiner," "regarding patent application" and "growing . . . thin films on a substrate" using natural language processing to identify topics, such as teleconference call with Examiner, patent application and growing thin films on a substrate. In one embodiment, the keywords may be any natural language element.

Furthermore, in one embodiment, calendar client agent extracts the flags (e.g., confidential, personal), if any, for each selected scheduled event from the calendar information obtained from the user's calendar application (e.g., Google® Calendar) via the calendar application's application programming interface (API). In one embodiment, appropriate action is taken by client calendar agent 106 in response to identifying particular flags (e.g., confidential) that indicate special user action. For example, a confidential meeting will only be recommended to be reassigned to other users who are authorized to participate in the confidential meeting in attempting to optimize the user's calendar as discussed below. In another example, a flag may indicate restrictions in forwarding or delegating the scheduled event. In another example, a flag may indicate processing restrictions, such as restrictions in processing calendar requests.

In step 305, calendar client agent 106 identifies prior collaborations with user 101 (user of the calendar application) involving the extracted attendees and/or topics of the selected scheduled events. In one embodiment, such prior collaborations with user 101 involve social media posts, e-mail messages, instant messages and previously scheduled calendar events with user 101.

In step 306, calendar client agent 106 extracts collaboration data from the identified prior collaborations. "Collaboration data," as used herein, refers to data concerning the interaction between user 101 and others involving an activity (e.g., work activity, such as a meeting, social activity). Examples of such collaboration data. include the names of the participants/senders/attendees in the social media posts, e-mail messages, instant messages and previously scheduled calendar events as well as the topics of such prior collaborations.

In one embodiment, calendar client agent 106 utilizes natural language processing to identify topics of interest for social media posts, e-mail messages, instant messages, etc. received by user 101. For instance, calendar client agent 106 using natural language processing may identify keywords (e.g., "growing thin films on a substrate") in an e-mail message regarding a patent application prosecuted by user 101.

In another embodiment, calendar client agent 106 utilizes natural language processing to identify topics of interest in previously scheduled calendar events with user 101.

In another embodiment, calendar client agent 106 extracts the names of the participants/senders/attendees in the social media posts, e-mail messages, instant messages and previously scheduled calendar events.

For one of the scheduled events out of the selected scheduled events that needs to be addressed during the period of time obtained in step 302, in step 307, calendar client agent 106 generates a list of actions to be performed on the scheduled event based on the extracted collaboration data. For example, the list of actions may include delegating the scheduled event to another user 101 (e.g., an attendee of the scheduled event) who engaged in a prior collaboration with user 101 (user of the calendar) involving a topic within a threshold degree of similarity as the topic of the scheduled event. For instance, client calendar agent 106 may determine that a second user 101 sent an e-mail message to a first user 101 involving the topic of growing thin films on a substrate. If client calendar agent 106 had previously determined that the first user 101 has a meeting involving a teleconference with an Examiner regarding references involving growing thin films on a substrate and the scheduled time of such a meeting overlaps another scheduled meeting, then client calendar agent 106 may recommend to delegate the scheduled meeting with the Examiner to the second user 101 as discussed further below.

In one embodiment, the topic of the scheduled event and the topic of the prior collaboration (e.g., prior e-mail correspondence) are determined using natural language processing. In one embodiment, the degree of similarity of the topic of the scheduled event and the topic of the prior collaboration (e.g., prior e-mail correspondence) is based, at least in part, on how close in meaning are the topics of the scheduled event and the prior collaboration. In one embodiment, the threshold used in the threshold degree of similarity is user provided.

In another example, the list of actions may include cancelling the scheduled event, declining the scheduled event, delegating the scheduled meeting to a team, reducing a number of attendees of the scheduled event, increasing a number of attendees of the scheduled event, reassigning chairmanship (organizer) of the scheduled event, etc.

In one embodiment, another user 101 (e.g., user 10113) may only be selected to delegate a scheduled event for user 101 (e.g., user 101A) if that user 101 (e.g., user 101B) had a threshold number of interactions with user 101 (e.g., user 101A) involving the topic of the scheduled event.

In one embodiment, another user 101 (e.g., user 101A) may only be selected to delegate a scheduled event for user 101 (e.g., user 101A) if that user 101 (e.g., user 101B) is a member of the same team, group, etc. as user 101 (e.g., user 101A).

In step 308, calendar client agent 106 presents the generated list of actions to be performed on a scheduled event (e.g., meeting 1 of FIG. 4) to user 101 (user of the calendar application).

In step 309, a determination is made by calendar client agent 106 as to whether it received a selection of an action from the list of actions from user 101.

If calendar client agent 106 does not receive a selection of an action from the list of actions from user 101, then, in step 310, calendar client agent 106 does not perform an action on the scheduled event.

In step 311, a determination is made by calendar client agent 106 as to whether any other scheduled events (out of the selected scheduled events) need to be addressed. For example, referring to FIG. 4, if meeting 1 was the only scheduled event that was addressed, then the other scheduled events (e.g., meetings 2-5) with a scheduled time that overlap one another still need to be addressed.

If there are other scheduled events that need to be addressed, then calendar client agent 106 generates a list of actions to be performed on a scheduled event out of the selected scheduled events based on the extracted collaboration data in step 307.

If, however, there are no other scheduled events that need to be addressed, then calendar client agent 106 continues to determine whether there is a need to optimize the user's calendar in step 301.

Returning to step 309, if, however, calendar client agent 106 received a selection of an action from the list of actions from user 101, then, in step 312, calendar client agent 106 performs the selected action on the scheduled event as illustrated in FIG. 5.

FIG. 5 illustrates presenting to user 101 (user of the calendar application) on user interface 500 (displayed on the user interface of computing device 101) the option of delegating a scheduled event to another user 101 in accordance with an embodiment of the present invention.

As illustrated in FIG. 5, user 101 is presented an option with assigning or delegating meeting 1 to a different user (e.g., user A) to address the situation where meeting 1 is scheduled during a time that other meetings were scheduled as discussed in FIG. 4.

Referring to the example discussed above, if client calendar agent 106 had previously determined that the first user 101 has a meeting involving a teleconference with an Examiner regarding references involving growing thin films on a substrate and the scheduled time of such a meeting overlaps another scheduled meeting, then client calendar agent 106 may recommend to delegate the scheduled meeting with the Examiner to the second user 101. In such a situation, client calendar agent 106 may recommend to the first user 101 to delegate the scheduled meeting to the second user 101, such as shown in FIG. 5.

As illustrated in FIG. 5, in one embodiment, user 101 is provided the option of accepting or declining (see accept button 501 and decline button 502, respectively, in FIG. 5) the option of assigning or delegating meeting 1 to a different user as shown in FIG. 5.

In one embodiment, if user 101 selects the option of delegating the scheduled event to another user, such as via selecting accept button 501, then client calendar agent 106 forwards an invitation to that user to delegate that scheduled event.

Other actions that may be performed to optimize the calendar include cancelling the scheduled event, declining the scheduled event, delegating the scheduled meeting to a team, reducing a number of attendees of the scheduled event, increasing a number of attendees of the scheduled event, reassigning chairmanship (organizer) of the scheduled event, etc. By implementing these actions, user 101 will be able to optimize the calendar to address situations, such as having an excessive number of scheduled events over a period of time, an overlap of scheduled events over a period of time, a duplicate scheduled event, scheduling a vacation during a time in which events have previously been scheduled, having an excessive amount of work to be accomplished, etc. By using computing technology to identify such situations and to utilize collaboration data from prior collaborations with the user, various actions may be proposed to the user to address such situations. In this manner, the functionality of calendaring systems is improved by allowing the user to better manage the user's scheduled events in the user's calendar.

Returning to FIG. 3, in conjunction with FIGS. 1-2 and 4-5, after performing the selected action on the scheduled event, calendar client agent 106 determines whether any other scheduled events out of the selected scheduled events) need to be addressed in step 311.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for managing a calendar application, the method comprising:
    identifying a need to optimize a calendar by a calendar client agent of a computing device by obtaining calendar information from a user's calendar application via an application programming interface of the user's calendar application, wherein the need to optimize the calendar is identified from the obtained calendar information based on detecting a number of scheduled events exceeding a threshold number over a period of time, detecting an overlap of scheduled events over a period of time, detecting a vacation, or detecting a duplicate scheduled event;
    receiving or identifying a period of time to optimize the calendar, wherein the period of time is determined based on a period of time the calendar client agent determined that a need existed to optimize the calendar;
    selecting all scheduled events in the calendar during the period of time to optimize the calendar;
    extracting attendees, topics and flags for each selected scheduled event during the period of time, wherein the attendees for each selected scheduled event are extracted from the calendar information obtained from the user's calendar application via the application programming interface of the user's calendar application, wherein the topics are extracted for each selected scheduled event using natural language processing utilized by the calendar client agent, wherein the flags are extracted for each selected scheduled event from the calendar information obtained from the user's calendar application via the application programming interface of the user's calendar application, wherein action is taken by the client calendar agent in response to identifying particular flags that indicate special user action;

identifying prior collaborations with a user of the calendar involving the extracted attendees and topics of the selected scheduled events;

extracting collaboration data from the identified prior collaborations, wherein the collaboration data comprises data concerning an interaction between the user and others involving an activity;

generating a list of actions to be performed on a scheduled event of the selected scheduled events based on the extracted collaboration data;

presenting the generated list of actions to the user of the calendar to be performed on the scheduled event to the user;

determining whether the user selected an action from the list of actions; and performing an action on the scheduled event in response to the user selecting the action from the list of actions thereby improving a functionality of calendaring systems by allowing the user to better manage the user's scheduled events in the user's calendar.

2. The method as recited in claim 1, wherein the prior collaborations involving the extracted attendees and topics of the selected scheduled events comprise social media posts, e-mail messages, instant messages and previously scheduled calendar events.

3. The method as recited in claim 2, wherein the period of time is determined based on a period of time the calendar client agent determined that a need existed to optimize the calendar, wherein the calendar client agent utilizes natural language processing to identify topics of interest in the previously scheduled calendar events.

4. The method as recited in claim 1, wherein the list of actions comprises delegating the scheduled event to a second user who engaged in a prior collaboration with the user of the calendar involving a topic of the scheduled event within a threshold degree of similarity as a topic of the scheduled event.

5. The method as recited in claim 1 further comprising:
recommending to delegate a scheduled meeting to a second user;
providing an option to the user of accepting or declining the delegation of the scheduled meeting to the second user via an accept button or a decline button, respectively;
receiving from the user an indication to delegate the scheduled event to the second user via a selection of the accept button; and
forwarding an invitation to the second user to delegate the scheduled event.

6. The method as recited in claim 1, wherein the list of actions comprises one or more of the following: cancelling the scheduled event, declining the scheduled event, delegating the scheduled meeting to a team, reducing a number of attendees of the scheduled event, increasing a number of attendees of the scheduled event, and reassigning chairmanship of the scheduled event.

7. The method as recited in claim 1, wherein the flags indicate restrictions in forwarding or delegating a scheduled event or indicate restrictions in processing calendar requests.

8. A computer program product for managing a calendar application, the computer program product comprising one or more computer readable storage mediums having program code embodied therewith, the program code comprising programming instructions for:
identifying a need to optimize a calendar by a calendar client agent of a computing device by obtaining calendar information from a user's calendar application via an application programming interface of the user's calendar application, wherein the need to optimize the calendar is identified from the obtained calendar information based on detecting a number of scheduled events exceeding a threshold number over a period of time, detecting an overlap of scheduled events over a period of time, detecting a vacation, or detecting a duplicate scheduled event;

receiving or identifying a period of time to optimize the calendar, wherein the period of time is determined based on a period of time the calendar client agent determined that a need existed to optimize the calendar;

selecting all scheduled events in the calendar during the period of time to optimize the calendar;

extracting attendees, topics and flags for each selected scheduled event during the period of time, wherein the attendees for each selected scheduled event are extracted from the calendar information obtained from the user's calendar application via the application programming interface of the user's calendar application, wherein the topics are extracted for each selected scheduled event using natural language processing utilized by the calendar client agent, wherein the flags are extracted for each selected scheduled event from the calendar information obtained from the user's calendar application via the application programming interface of the user's calendar application, wherein action is taken by the client calendar agent in response to identifying particular flags that indicate special user action;

identifying prior collaborations with a user of the calendar involving the extracted attendees and topics of the selected scheduled events;

extracting collaboration data from the identified prior collaborations, wherein the collaboration data comprises data concerning an interaction between the user and others involving an activity;

generating a list of actions to be performed on a scheduled event of the selected scheduled events based on the extracted collaboration data;

presenting the generated list of actions to the user of the calendar to be performed on the scheduled event to the user;

determining whether the user selected an action from the list of actions; and performing an action on the scheduled event in response to the user selecting the action from the list of actions thereby improving a functionality of calendaring systems by allowing the user to better manage the user's scheduled events in the user's calendar.

9. The computer program product as recited in claim 8, wherein the prior collaborations involving the extracted attendees and topics of the selected scheduled events comprise social media posts, e-mail messages, instant messages and previously scheduled calendar events.

10. The computer program product as recited in claim 9, wherein the period of time is determined based on a period of time the calendar client agent determined that a need existed to optimize the calendar, wherein the calendar client agent utilizes natural language processing to identify topics of interest in the previously scheduled calendar events.

11. The computer program product as recited in claim 8, wherein the list of actions comprises delegating the scheduled event to a second user who engaged in a prior collaboration with the user of the calendar involving a topic of the scheduled event within a threshold degree of similarity as a topic of the scheduled event.

12. The computer program product as recited in claim 8, wherein the program code further comprises the programming instructions for:
   recommending to delegate a scheduled meeting to a second user;
   providing an option to the user of accepting or declining the delegation of the scheduled meeting to the second user via an accept button or a decline button, respectively;
   receiving from the user an indication to delegate the scheduled event to the second user via a selection of the accept button; and
   forwarding an invitation to the second user to delegate the scheduled event.

13. The computer program product as recited in claim 8, wherein the list of actions comprises one or more of the following: cancelling the scheduled event, declining the scheduled event, delegating the scheduled meeting to a team, reducing a number of attendees of the scheduled event, increasing a number of attendees of the scheduled event, and reassigning chairmanship of the scheduled event.

14. The computer program product as recited in claim 8, wherein the flags indicate restrictions in forwarding or delegating a scheduled event or indicate restrictions in processing calendar requests.

15. A system, comprising:
   a memory for storing a computer program for managing a calendar application; and
   a processor connected to the memory, wherein the processor is configured to execute program instructions of the computer program comprising:
      identifying a need to optimize a calendar by a calendar client agent of the system by obtaining calendar information from a user's calendar application via an application programming interface of the user's calendar application, wherein the need to optimize the calendar is identified from the obtained calendar information based on detecting a number of scheduled events exceeding a threshold number over a period of time, detecting an overlap of scheduled events over a period of time, detecting a vacation, or detecting a duplicate scheduled event;
      receiving or identifying a period of time to optimize the calendar, wherein the period of time is determined based on a period of time the calendar client agent determined that a need existed to optimize the calendar;
      selecting all scheduled events in the calendar during the period of time to optimize the calendar;
      extracting attendees, topics and flags for each selected scheduled event during the period of time, wherein the attendees for each selected scheduled event are extracted from the calendar information obtained from the user's calendar application via the application programming interface of the user's calendar application, wherein the topics are extracted for each selected scheduled event using natural language processing utilized by the calendar client agent, wherein the flags are extracted for each selected scheduled event from the calendar information obtained from the user's calendar application via the application programming interface of the user's calendar application, wherein action is taken by the client calendar agent in response to identifying particular flags that indicate special user action;
      identifying prior collaborations with a user of the calendar involving the extracted attendees and topics of the selected scheduled events;
      extracting collaboration data from the identified prior collaborations, wherein the collaboration data comprises data concerning an interaction between the user and others involving an activity;
      generating a list of actions to be performed on a scheduled event of the selected scheduled events based on the extracted collaboration data;
      presenting the generated list of actions to the user of the calendar to be performed on the scheduled event to the user;
      determining whether the user selected an action from the list of actions; and
      performing an action on the scheduled event in response to the user selecting the action from the list of actions thereby improving a functionality of calendaring systems by allowing the user to better manage the user's scheduled events in the user's calendar.

16. The system as recited in claim 15, wherein the prior collaborations involving the extracted attendees and topics of the selected scheduled events comprise social media posts, e-mail messages, instant messages and previously scheduled calendar events.

17. The system as recited in claim 16, wherein the period of time is determined based on a period of time the calendar client agent determined that a need existed to optimize the calendar, wherein the calendar client agent utilizes natural language processing to identify topics of interest in the previously scheduled calendar events.

18. The system as recited in claim 15, wherein the list of actions comprises delegating the scheduled event to a second user who engaged in a prior collaboration with the user of the calendar involving a topic of the scheduled event within a threshold degree of similarity as a topic of the scheduled event.

19. The system as recited in claim 15, wherein the program instructions of the computer program further comprise:
   recommending to delegate a scheduled meeting to a second user;
   providing an option to the user of accepting or declining the delegation of the scheduled meeting to the second user via an accept button or a decline button, respectively;
   receiving from the user an indication to delegate the scheduled event to the second user via a selection of the accept button; and
   forwarding an invitation to the second user to delegate the scheduled event.

20. The system as recited in claim 15, wherein the list of actions comprises one or more of the following: cancelling the scheduled event, declining the scheduled event, delegating the scheduled meeting to a team, reducing a number of attendees of the scheduled event, increasing a number of attendees of the scheduled event, and reassigning chairmanship of the scheduled event.

* * * * *